(12) United States Patent
Verheul

(10) Patent No.: US 9,738,124 B1
(45) Date of Patent: Aug. 22, 2017

(54) DRAWBAR AND HITCH RECEIVER MOVEMENT ELIMINATING SYSTEMS

(71) Applicant: Daniel Verheul, Mount Albert (CA)

(72) Inventor: Daniel Verheul, Mount Albert (CA)

( * ) Notice: Subject to any disclaimer, the term of this patent is extended or adjusted under 35 U.S.C. 154(b) by 0 days.

(21) Appl. No.: 15/068,560

(22) Filed: Mar. 12, 2016

Related U.S. Application Data

(60) Provisional application No. 62/131,994, filed on Mar. 12, 2015.

(51) Int. Cl.
   *B60D 1/24*   (2006.01)
   *B60D 1/06*   (2006.01)
   *B60D 1/52*   (2006.01)

(52) U.S. Cl.
   CPC .............. *B60D 1/241* (2013.01); *B60D 1/06* (2013.01); *B60D 1/52* (2013.01)

(58) Field of Classification Search
   CPC .................................. B60D 1/52; B60D 1/241
   See application file for complete search history.

(56) References Cited

U.S. PATENT DOCUMENTS

| | | | | |
|---|---|---|---|---|
| 5,593,172 A | * | 1/1997 | Breslin | B60D 1/155 |
| | | | | 280/491.5 |
| 5,988,667 A | * | 11/1999 | Young | B60D 1/155 |
| | | | | 280/506 |
| 6,105,989 A | * | 8/2000 | Linger | B60D 1/241 |
| | | | | 280/506 |
| 6,283,489 B1 | | 9/2001 | Hoog | |
| 6,974,147 B1 | * | 12/2005 | Kolda | B60D 1/52 |
| | | | | 280/506 |
| 7,052,032 B1 | | 5/2006 | Adair | |
| 7,077,417 B2 | * | 7/2006 | Shoemaker | B60D 1/52 |
| | | | | 280/504 |
| 8,079,612 B1 | * | 12/2011 | Tambornino | B60D 1/241 |
| | | | | 224/519 |
| 8,328,222 B1 | | 12/2012 | Roeber et al. | |
| 8,696,011 B2 | * | 4/2014 | Despres | B60D 1/06 |
| | | | | 280/478.1 |
| 2009/0115165 A1 | * | 5/2009 | Coy | B60D 1/06 |
| | | | | 280/506 |

* cited by examiner

Primary Examiner — Kevin Hurley
(74) Attorney, Agent, or Firm — RG Patent Consulting, LLC; Rachel Gilboy

(57) ABSTRACT

A drawbar and hitch receiver movement eliminating system has three main embodiments, each very similar and functioning with the same operational characteristics though they vary slightly in structural characteristics. Each embodiment has a means for the drawbar to push outwardly against the face of the receiver to eliminate the typical movement of the drawbar within the receiver caused by the standard clearances between the two, thereby considerably reducing the amplified swaying movement of the trailer that is caused by the small movements of the drawbar within the receiver.

8 Claims, 6 Drawing Sheets

DRAWBAR AND HITCH RECEIVER MOVEMENT ELIMINATING SYSTEMS

CROSS-REFERENCE TO RELATED APPLICATION

The present application is related to and claims priority from prior provisional application Ser. No. 62/131,994, filed Mar. 12, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of trailer hitches and more specifically relates to drawbar and hitch receiver movement eliminating systems.

2. Description of the Related Art

There are many types of trailers that are being pulled by vehicles on highways and roads each day. These trailers range in size from small trailers that can be pulled by family cars, to large trailers for hauling heavy equipment that must be towed by adequately sized trucks having adequate horsepower for pulling the weight. There are many types of apparatuses used for towing trailers also. Commercially, these hitching apparatuses are designed for specific types and weights of trailers, with the most common being of the $5^{th}$ wheel style. Non-commercially, the most common type of hitch is the drawbar and receiver type of hitch that gained in popularity due to its versatility. This type of hitch generally has a receiver that is made most often of heavy duty square tubing. The tubing may have various types of mounting brackets or straps that adapt it to be rigidly mounted to the towing vehicle. A drawbar having a trailer ball attached in some fashion is generally constructed such that it has a heavy duty square tube portion that is sized to slide within the receiver and be locked into place by a heavy metal pin that passes through aligned holes in both the receiver and the drawbar. The versatility of such an arrangement is that the pin can be pulled and another drawbar having any number of types or sizes of trailer attachments, or even other devices not used for pulling trailers can be coupled to the vehicle. This probably makes this type of hitch the most common.

The drawbar is sized to easily slide into the receiver, using common sizes of readily available square tubing stock. The clearance between the outer surface of the drawbar and the inner surface of the receiver can become problematic when trailers are being towed which have comparatively high weights for the vehicle doing the towing, that have higher centers or gravity, or that have a balance point that is too far forward such as when a trailer is loaded too heavily behind the axle of the trailer. These things should never be attempted, but happen every day anyway to varying degrees. Very small amounts of movement between the drawbar and receiver can result in much larger, uncontrolled movements of the trailer and reduce the safety factor for the driver and others on the road. Various apparatuses have been designed to attempt to compensate for this, such as anti-sway bar devices, but they are very heavy and cumbersome to install and reinstall. An innovation that would greatly improve the convenience or reduce the labor and expense of using a device for this purpose is needed.

Various attempts have been made to solve the above-mentioned problems such as those found in U.S. Pat. No. 7,052,032 to Edward C. Adair, U.S. Pat. No. 6,283,489 to Josef Thomas Hoog, and U.S. Pat. No. 8,328,222 to Leslie Roeber. This art is representative of anti sway trailer hitches. None of the above inventions and patents, taken either singly or in combination, is seen to describe the invention as claimed.

Ideally, a trailer hitch should provide maximum safety and anti-sway tendencies and, yet would operate reliably and be manufactured at a modest expense. Thus, a need exists for a reliable drawbar and hitch receiver movement eliminating system to avoid the above-mentioned problems.

BRIEF SUMMARY OF THE INVENTION

In view of the foregoing disadvantages inherent in the known trailer hitch art, the present invention provides a novel drawbar and hitch receiver movement eliminating system. The general purpose of the present invention, which will be described subsequently in greater detail, is to provide greater convenience, reduced labor, and reduced cost.

The drawbar and hitch receiver movement eliminating system has three main embodiments each very similar and functioning with the same operational characteristics. The first embodiment, the drawbar and hitch receiver movement eliminating system preferably has a receiver portion having a vehicle mount on a first end and a drawbar receiver on a second end, a drawbar portion having a receivable shaft, a movement adjustment portion, and a movement adjustment nut, a ball mount portion having a movement adjustment attachment end, a ball throughhole end, a first side, and a second side, lateral lock pin holes through the receivable shaft and the drawbar portion that may be brought into alignment, a lateral lock pin for inserting through the plurality of lateral lock pin holes, and a trailer ball comprising a coupler first portion, a shaft boss, a threaded shaft, and a shaft nut.

The receiver portion is a square tube having a first end and a second end. The second end has a front face that is larger in width and height than the width and height of the tubing itself, with the front face being a flat surface. The vehicle mount is nonremovably attached to the first end of the drawbar receiver and generally is structured differently for different makes and years of towing vehicles. The drawbar portion has a receivable shaft, a movement adjustment portion, and a movement adjustment nut. The receivable shaft and the movement adjustment portion are linearly and integrally constructed and the movement adjustment portion of the drawbar portion is cylindrically shaped and transitions to a square cross-section at the receivable shaft. The movement adjustment portion comprises male threads on the exterior periphery and the movement adjustment nut comprises female threads on the inner periphery such that the movement adjustment portion and the movement adjustment nut are adapted to be threadably coupled together via the male threads of the movement adjustment portion and the female threads of the movement adjustment nut. The male threads of the movement adjustment portion are adapted to prevent the movement adjustment nut from contacting the second side of the movement adjustment attachment end of the ball mount portion. The movement adjustment nut is removable from the drawbar portion. The movement adjustment nut comprises equidistantly spaced linear groves deposed longitudinally across an exterior of the movement adjustment nut for gripping via a spanner wrench. The spanner wrench may be common or standard for convenience, and not proprietary. The movement adjustment nut is substantially cylindrical and adapted to be rotated via the spanner wrench. The ball mount portion has a movement adjustment attachment end, a ball throughhole end, a first side, and a second side. The second side of the movement adjustment attachment end is non-removably attached to the movement adjustment portion of the drawbar portion. The movement adjustment nut of the drawbar portion and the front face of the drawbar receiver each comprise a flat contact face adapted for contacting each other during an in-use condition.

A trailer ball comprises a coupler first portion, a shaft boss, a threaded shaft, and a shaft nut. The coupler first portion, the shaft boss, and the threaded shaft are linearly and integrally formed and the shaft nut is designed to be threadably coupled to the threaded shaft. The threaded shaft is adapted to be inserted through a throughhole of the ball throughhole end and rigidly attached via a threadably coupling of the shaft nut to the threaded shaft. The outside dimension of the receivable shaft is sized such that it is able to be slideably inserted into the tubular portion of the second end of the drawbar receiver and locked in place via a lateral lock pin. The lateral lock pin is insertable through a series of laterally deposed and aligned lateral lock pin holes in the tubular portion and the receivable shaft. The receivable shaft of the drawbar portion and the tubular portion of the drawbar receiver each are adapted to have a substantially square cross-section. The movement adjustment nut is able to be threadably adjusted to contact the front face of the tubular portion of the second end of the drawbar receiver when the drawbar and hitch receiver movement eliminating system is in an assembled condition on a towing vehicle to eliminate the lateral and vertical movement of the drawbar portion within the drawbar receiver to stabilize the swaying motion of a trailer coupled to the towing vehicle to increase the safety factor.

The second embodiment, the drawbar and hitch receiver movement eliminating clamp preferably comprises a receiver having a vehicle mount on the first end and a drawbar receiver on the second end with the second end having a tubular portion with a front face, and a drawbar having a receivable shaft and a ball mount portion. The ball mount portion comprises a drawbar end, a ball throughhole end, a first side, and a second side, a clamp portion having a movement eliminating bolt, a first half, and a second half with the first half having a first side, a second side, a top side, and a bottom side, a trailer ball comprising a coupler first portion, a shaft boss, a threaded shaft, and a shaft nut.

The vehicle mount is nonremovably attached to the first end of the drawbar receiver just as in the first embodiment, and the second end has a receiver having a tubular portion with a front face. The ball mount portion has a second side that is non-removably attached to one end of the receivable shaft of the drawbar. The first half and the second half of the clamp portion is substantially U-shaped conforming to a top half and a bottom half of the exterior surface of a cross-section of the receivable shaft of the drawbar and is designed to opposingly clamp about the exterior surface of the receivable shaft via at least one fastener passing through each end of both the first half and the second half of the clamp portion through cylindrically shaped through-holes passing vertically through the top side to the bottom side of each end with the movement eliminating bolt threadably extending through the first half of the clamp portion, from the first side to the second side, to contact the front face of the drawbar receiver. The clamp portion is able to be slideably moved along the drawbar when the fasteners are loose in order to adjust the position of the clamp portion in relation to the front face to ensure there are adequate threads on the movement eliminating bolt to tighten it against the front face of the drawbar receiver. The movement eliminating bolt is tightened against the front face via a clockwise rotation to set the clamp and remove any horizontal or vertical movement of the ball mount portion in relation to the drawbar receiver when the drawbar and hitch receiver movement eliminating clamp is in an assembled condition and is installed on the towing vehicle and trailer to eliminate lateral and vertical movement of the drawbar within the receiver for stabilizing any swaying motion of the trailer coupled to the towing vehicle that might result when moving at normal travel speeds. The movement eliminating bolt threadably passes through the center portion of the first half of the clamp portion, from the first side through to the second side utilizing a lock nut to lock the adjustment in place. The movement eliminating bolt is angled downward from horizontal at about 10 degrees to contact the front face of the drawbar receiver. This is needed to have clearance between the receivable shaft of the drawbar for tightening the head with a wrench.

The coupler first portion of the trailer ball, the shaft boss, and the threaded shaft are linearly and integrally formed and the shaft nut is designed to be threadably coupled onto or to be removable from the threaded shaft. The threaded shaft is adapted to be inserted through a throughhole of the ball throughhole end and rigidly attached via a threadably coupled shaft nut to the threaded shaft.

The outside dimension of the receivable shaft is sized so that it is able to be slideably inserted into the tubular portion of the second end of the receiver and locked in place via a lateral lock pin. The lateral lock pin is insertable through a plurality of laterally deposed and aligned lateral lock pin holes in the tubular portion and in the receivable shaft and in the drawbar receiver.

The third embodiment, the movement eliminating trailer hitch ball-mount system preferably comprises a receiver having a vehicle mount on the first end, a drawbar receiver on the second end which is a tubular portion with a front face, a drawbar having a receivable shaft, and a ball mount portion which comprises a drawbar end a ball throughhole end, a first side and a second side, and a movement eliminating bolt, a trailer ball comprising a coupler first portion, a shaft boss, a threaded shaft, and a shaft nut. The vehicle mount is nonremovably attached to the first end of the drawbar receiver as in the other embodiments. The second side of the ball mount portion is non-removably attached to one end of the receivable shaft of the drawbar. The movement eliminating bolt threadably extends through the ball mount portion from the first side through to the second side above an attachment point of the receivable shaft on the second side. The upwardly angled two thirds portion of the ball mount portion is attached to the receivable shaft on the second side leaving an adequate space above it for the movement eliminating bolt hole and for the movement eliminating bolt to threadably pass through without interference from the receivable shaft. The movement eliminating bolt is positioned horizontally through the ball mount portion, is positioned parallel to the receivable shaft, and includes a backup nut for locking the adjustment of the movement eliminating bolt in relation to the ball mount portion and against the front face of the tubular portion. The ball mount portion is comprised of flat bar steel having a two thirds portion of the total length angled upward at about 65 degrees from the horizontal ⅓ portion. The horizontal ⅓ portion has the throughhole for installation of the trailer ball. A trailer ball comprises a coupler first portion, a shaft boss, a threaded shaft, and a shaft nut. The ball mount portion includes a movement eliminating bolt hole having female threads about the inner periphery and the movement eliminating bolt comprises male threads about the outer periphery for threadably coupling the movement eliminating bolt through the movement eliminating bolt hole of the ball mount portion to contact the front face of the drawbar receiver.

The coupler first portion, the shaft boss, and the threaded shaft are linearly and integrally formed and the shaft nut is designed to be threadably coupled to the threaded shaft. It should be noted that the coupler second portion is the ball socket of the trailer tongue in all embodiments. The threaded shaft is adapted to be inserted through a throughhole of the ball throughhole end and rigidly attached by threading the shaft nut onto the threaded shaft and tightening. The outside dimension of the receivable shaft is sized such that it is able to be slideably inserted into the tubular portion of the second end of the receiver and locked in place via a lateral lock pin. The lateral lock pin is insertable through a plurality of laterally deposed and aligned lateral lock pin holes in the tubular portion and in the receivable shaft. The movement eliminating bolt is able to be threadably adjusted to contact the front face of the tubular portion of the second end of the receiver when the movement eliminating trailer hitch ball-mount system is in an assembled condition and installed on a towing vehicle and a trailer, to eliminate the lateral and vertical movement of the drawbar within the receiver to stabilize any swaying motion during travel which increases the safety factor of towing a trailer.

The present invention holds significant improvements and serves as a drawbar and hitch receiver movement eliminating systems. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, drawbar and hitch receiver movement eliminating systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a trailer hitch and more particularly to a drawbar and hitch receiver movement eliminating systems as used to improve the maximum safety and anti-sway tendencies.

Generally speaking, drawbar and hitch receiver movement eliminating systems has three main embodiments, each very similar and functioning with the same operational characteristics though they vary slightly in structural characteristics. Each embodiment has a means for the drawbar to push outwardly against the face of the receiver to eliminate the typical movement of the drawbar within the receiver caused by the standard clearances between the two, thereby considerably reducing the amplified swaying movement of the trailer that is caused by the small movements of the drawbar within the receiver.

Figure 1A:
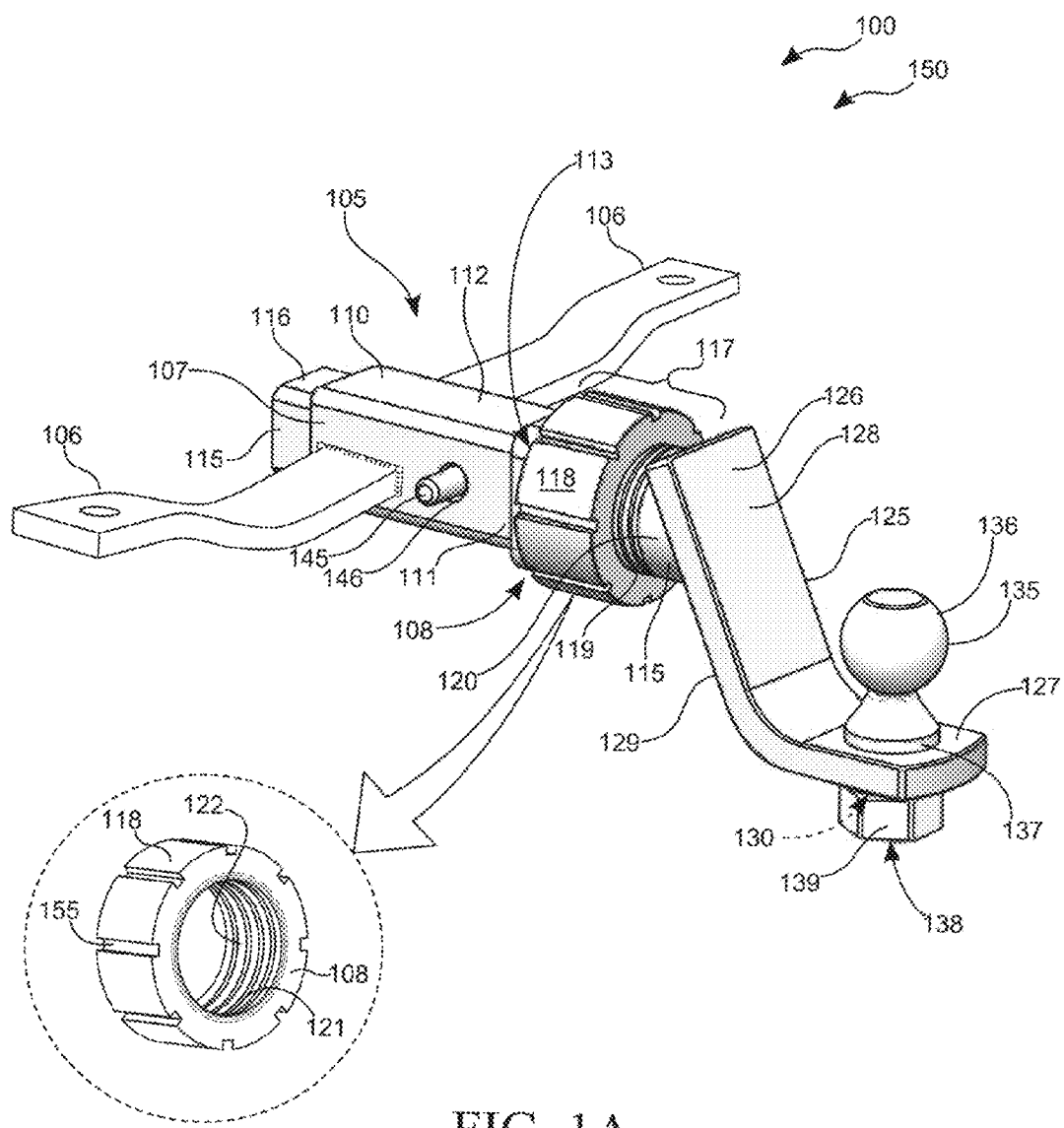
FIG. 1A shows perspective view of a first embodiment illustrating a drawbar and hitch receiver movement eliminating system according to an embodiment of the present invention.

Referring to the drawings by numerals of reference there is shown in FIG. 1A a perspective view of a first embodiment illustrating drawbar and hitch receiver movement eliminating system 100 according to an embodiment of the present invention.

The first embodiment, drawbar and hitch receiver movement eliminating system 100 preferably has receiver portion 105 having vehicle mount 106 on first end 107 and drawbar receiver 110 on second end 111, drawbar portion 115 having receivable shaft 116, movement adjustment portion 117, and movement adjustment nut 118, ball mount portion 125 having movement adjustment attachment end 126, ball throughhole end 127, first side 128, and second side 129, lateral lock pin holes 146 through receivable shaft 116 and drawbar receiver 110 that may be brought into alignment, a lateral lock pin 145 for inserting through the plurality of lateral lock pin holes 146, and trailer ball 135 comprising coupler first portion 136, shaft boss 137, threaded shaft 138, and shaft nut 139.

Figure 1B:
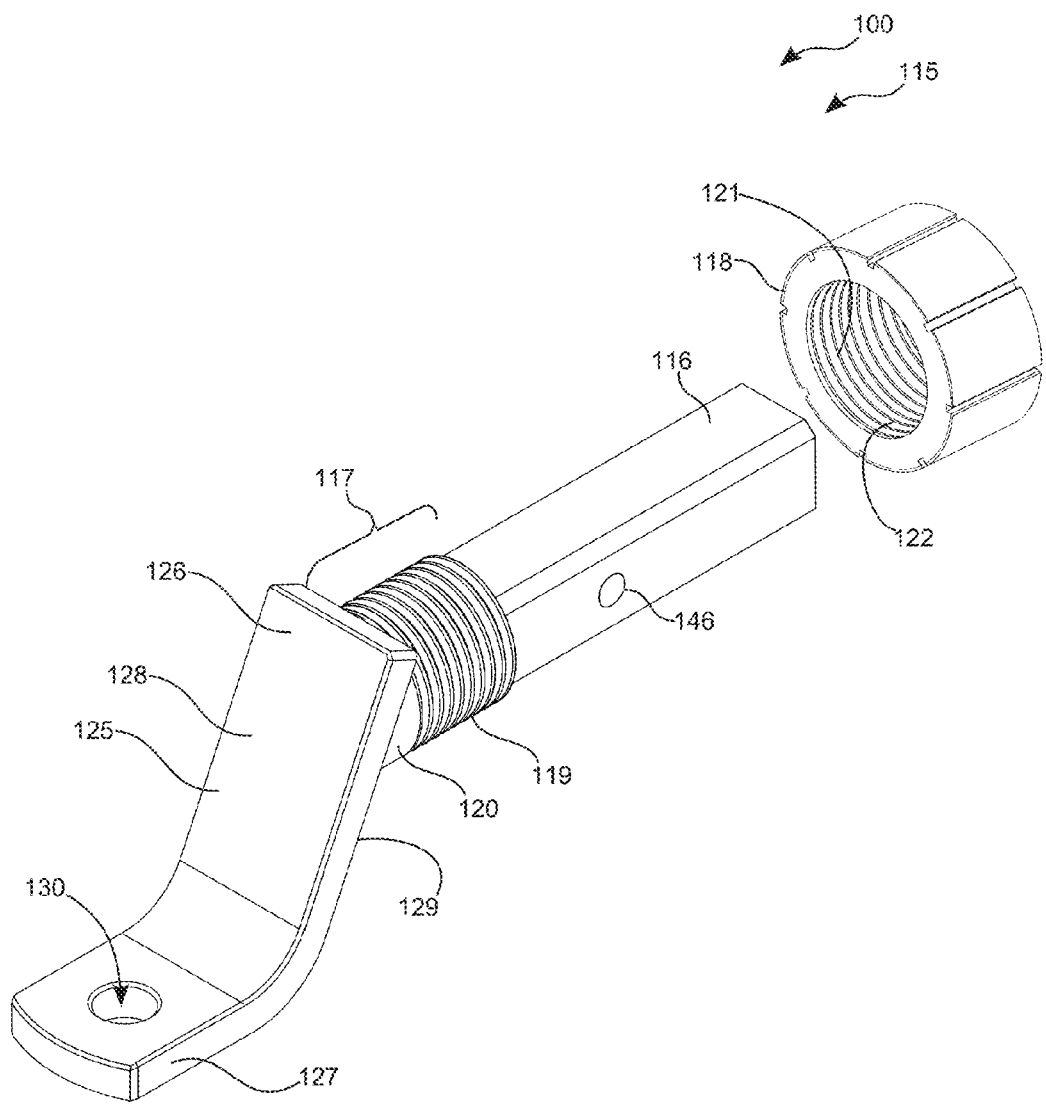
FIG. 1B shows another perspective view of the first embodiment illustrating the drawbar and hitch receiver movement eliminating system according to an embodiment of the present invention of FIG. 1A.

Referring now to FIG. 1B showing another perspective view of the first embodiment illustrating drawbar and hitch receiver movement eliminating system 100 according to an embodiment of the present invention of FIG. 1A.

Receiver portion 105 is a square tube having first end 107 and second end 111. Second end 111 has front face 113 that is larger in width and height than the width and height of tubular portion 112 itself, with front face 113 being a flat surface. Vehicle mount 106 is nonremovably attached to first end 107 of drawbar receiver 110 and generally is structured differently for different makes and years of towing vehicles. Drawbar portion 115 has receivable shaft 116, movement adjustment portion 117, and movement adjustment nut 118. Receivable shaft 116 and movement adjustment portion 117 are linearly and integrally constructed and movement adjustment portion 117 of drawbar portion 115 is cylindrically shaped and transitions to a square cross-section at receivable shaft 116. Movement adjustment portion 117 comprises male threads 119 on exterior periphery 120 and movement adjustment nut 118 comprises female threads 121 on inner periphery 122 such that movement adjustment portion 117 and movement adjustment nut 118 are adapted to be threadably coupled together via male threads 119 of movement adjustment portion 117 and female threads 121 of movement adjustment nut 118. Male threads 119 of movement adjustment portion 117 are adapted to prevent movement adjustment nut 118 from contacting second side 129 of movement adjustment attachment end 126 of ball mount portion 125. Movement adjustment nut 118 is removable from drawbar portion 115. Movement adjustment nut 118 comprises equidistantly spaced linear groves 155 deposed longitudinally across an exterior of movement adjustment nut 118 for gripping via a spanner wrench. The spanner wrench may be common or standard for convenience, and preferably not proprietary. Movement adjustment nut 118 is substantially cylindrical and adapted to be rotated via the spanner wrench. Ball mount portion 125 has movement adjustment attachment end 126, ball throughhole end 127, first side 128, and second side 129. Second side 129 of movement adjustment attachment end 126 is non-removably attached to movement adjustment portion 117 of drawbar portion 115. Movement adjustment nut 118 of drawbar portion 115 and front face 113 of drawbar receiver 110 each comprise flat contact face 108 adapted for contacting each other during an in-use condition.

Trailer ball 135 comprises coupler first portion 136, shaft boss 137, threaded shaft 138, and shaft nut 139. Coupler first portion 136, shaft boss 137, and threaded shaft 138 are linearly and integrally formed and shaft nut 139 is designed to be threadably coupled to threaded shaft 138. Threaded shaft 138 is adapted to be inserted through a throughhole of ball throughhole end 127 and rigidly attached via threadably coupling the shaft nut 139 to threaded shaft 138. The outside dimension of receivable shaft 116 is sized such that it is able to be slideably inserted into tubular portion 112 of second end 111 of drawbar receiver 110 and locked in place via lateral lock pin 145. Lateral lock pin 145 is insertable through a series of laterally deposed and aligned lateral lock pin holes 146 in tubular portion 112 and receivable shaft 116. Receivable shaft 116 of drawbar portion 115 and tubular portion 112 of drawbar receiver 110 each are adapted to have a substantially square cross-section. Movement adjustment nut 118 is able to be threadably adjusted to contact front face 113 of tubular portion 112 of second end 111 of drawbar receiver 110 when drawbar and hitch receiver movement eliminating system 100 is in an assembled condition on a towing vehicle to eliminate the lateral and vertical movement of drawbar portion 115 within drawbar receiver 110 to stabilize the swaying motion of a trailer coupled to the towing vehicle to increase the safety factor.

Figure 2A:
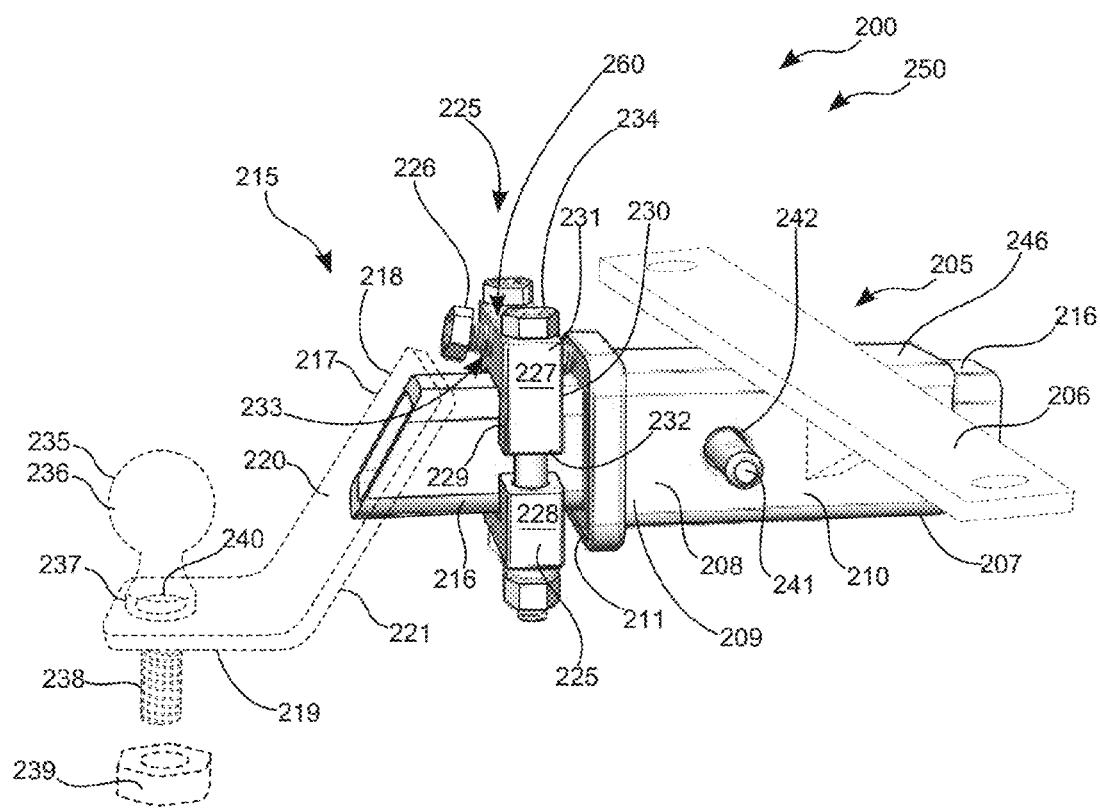
FIG. 2A is a perspective view of a second embodiment illustrating a drawbar and hitch receiver movement eliminating clamp according to an embodiment of the present invention.

Referring now to FIG. 2A is a perspective view of a second embodiment illustrating drawbar and hitch receiver movement eliminating clamp 200 according to an embodiment of the present invention.

The second embodiment, drawbar and hitch receiver movement eliminating clamp 200 preferably comprises receiver 205 having vehicle mount 206 on first end 207 and drawbar receiver 208 on second end 209 with second end 209 having tubular portion 210 with front face 211, and drawbar 215 having receivable shaft 216 and ball mount portion 217. Ball mount portion 217 comprises drawbar end 218, ball throughhole end 219, first side 220, and second side 221, clamp portion 225 having movement eliminating bolt 226, first half 227, and second half 228 with first half 227 having first side 229, second side 230, top side 231, and bottom side 232, trailer ball 235 comprising coupler first portion 236, shaft boss 237, threaded shaft 238, and shaft nut 239.

Figure 2B:
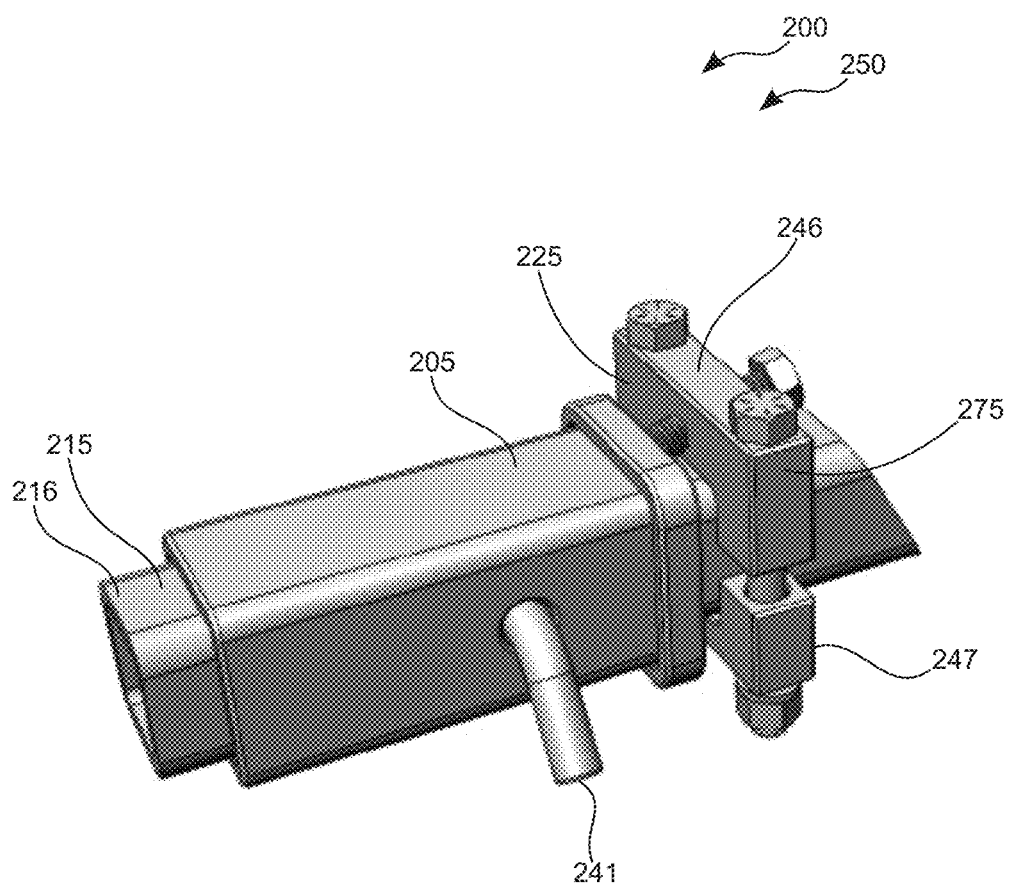
FIG. 2B is another perspective view of the second embodiment illustrating the drawbar and hitch receiver movement eliminating clamp according to an embodiment of the present invention of FIG. 2A.

Referring now to FIG. 2B is another perspective view of the second embodiment illustrating drawbar and hitch receiver movement eliminating clamp 200 according to an embodiment of the present invention of FIG. 2A.

Vehicle mount 206 is nonremovably attached to first end 207 of drawbar receiver 208 just as in the first embodiment, and second end 209 has receiver 205 having tubular portion 210 with front face 211. Ball mount portion 217 has second side 230 that is non-removably attached to one end of receivable shaft 216 of drawbar 215. First half 227 and second half 228 of clamp portion 225 is substantially U-shaped conforming to top half 246 and bottom half 247 of the exterior surface of a cross-section of receivable shaft 216 of drawbar 215 and is designed to opposingly clamp about the exterior surface of receivable shaft 216 via at least one fastener 270 passing through each end 275 of both first half 227 and second half 228 of clamp portion 225 through cylindrically shaped through-holes 233 passing vertically through top side 231 to bottom side 232 of each end 275 with movement eliminating bolt 226 threadably extending through first half 227 of clamp portion 225, from first side 229 to second side 230, to contact front face 211 of drawbar receiver 208. Clamp portion 225 is able to be slideably moved along drawbar 215 when fastener(s) 270 are loose in order to adjust the position of clamp portion 225 in relation to front face 211 to ensure there are adequate threads on movement eliminating bolt 226 to tighten it against front face 211 of drawbar receiver 208. Movement eliminating bolt 226 is tightened against front face 211 via a clockwise rotation to set clamp portion 225 and remove any horizontal or vertical movement of ball mount portion 217 in relation to drawbar receiver 208 when drawbar and hitch receiver movement eliminating clamp 200 is in an assembled condition and is installed on the towing vehicle and trailer to eliminate lateral and vertical movement of drawbar 215 within receiver 205 for stabilizing any swaying motion of the trailer coupled to the towing vehicle that might result when moving at normal travel speeds. Movement eliminating bolt 226 threadably passes through center portion 260 of first half 227 of clamp portion 225, from first side 229 through to second side 230 utilizing lock nut 280 to lock the adjustment in place. Movement eliminating bolt 226 is angled downward from horizontal at about 10 degrees to contact front face 211 of drawbar receiver 208. This is needed to have clearance between receivable shaft 216 of drawbar 215 for tightening the head with a wrench.

Coupler first portion 236 of trailer ball 235, shaft boss 237, and threaded shaft 238 are linearly and integrally formed and shaft nut 239 is designed to be threadably coupled onto or to be removable from threaded shaft 238. Threaded shaft 238 is adapted to be inserted through throughhole 240 of ball throughhole end 219 and rigidly attached via a threadably coupled shaft nut 239 to threaded shaft 238.

The outside dimension of receivable shaft 216 is sized so that it is able to be slideably inserted into tubular portion 210 of second end 209 of receiver 205 and locked in place via lateral lock pin 241. Lateral lock pin 241 is insertable through a plurality of laterally deposed and aligned lateral lock pin holes 242 in tubular portion 210 and in receivable shaft 216 and in drawbar receiver 208.

Figure 3A:
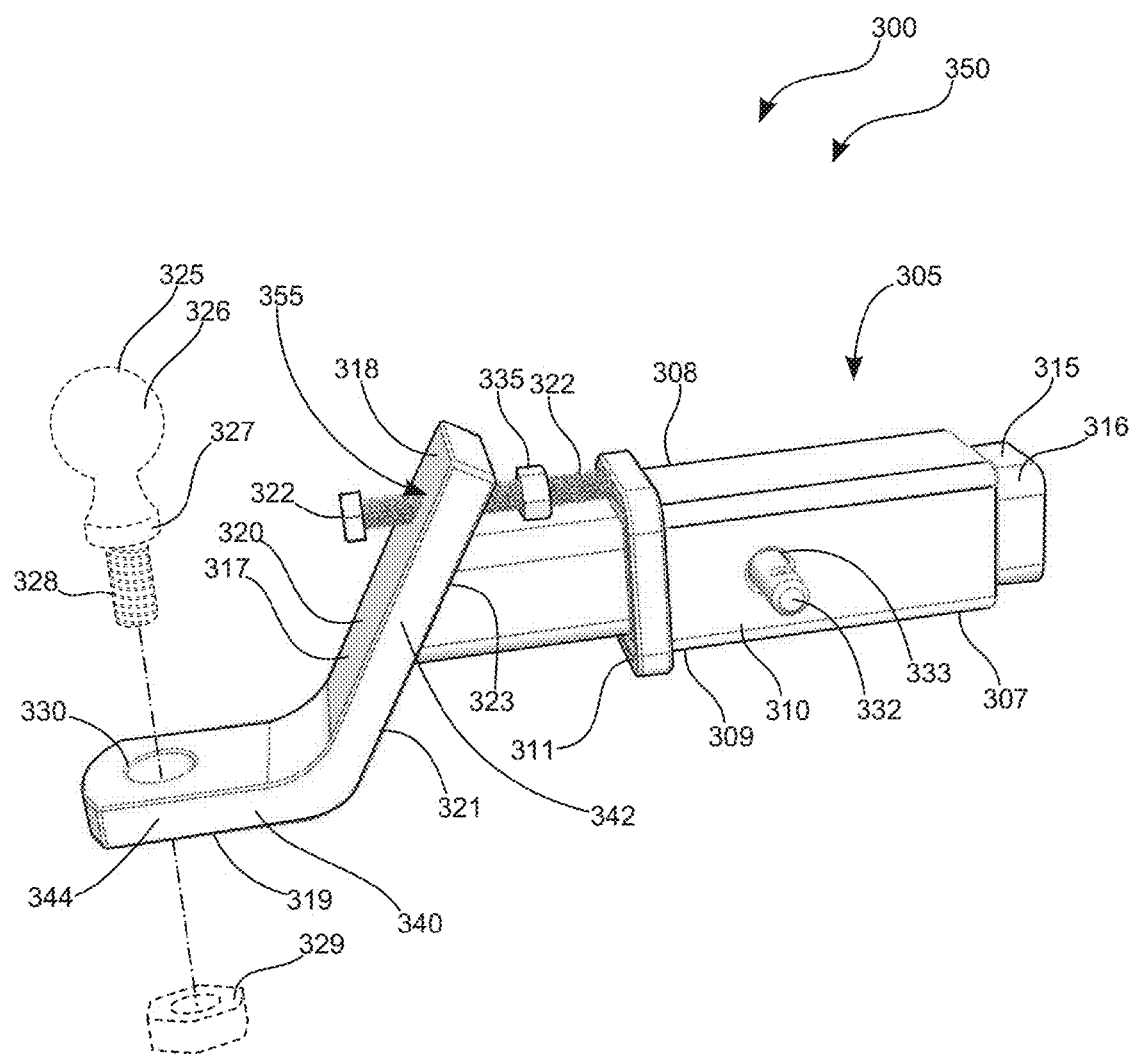
FIG. 3A is a perspective view of a third embodiment illustrating a movement eliminating trailer hitch ball-mount system according to an embodiment of the present invention.

Referring now to FIG. 3A is a perspective view of a third embodiment illustrating movement eliminating trailer hitch ball-mount system 300 according to an embodiment of the present invention.

The third embodiment, the movement eliminating trailer hitch ball-mount system 300 preferably comprises receiver 305 having vehicle mount 306 on first end 307, drawbar receiver 308 on second end 309 which is tubular portion 310 with front face 311, drawbar 315 having receivable shaft 316, and ball mount portion 317 which comprises drawbar end 318, ball throughhole end 319, first side 320 and second side 321, and movement eliminating bolt 322, trailer ball 325 comprising coupler first portion 326, shaft boss 327, threaded shaft 328, and shaft nut 329.

Figure 3B:
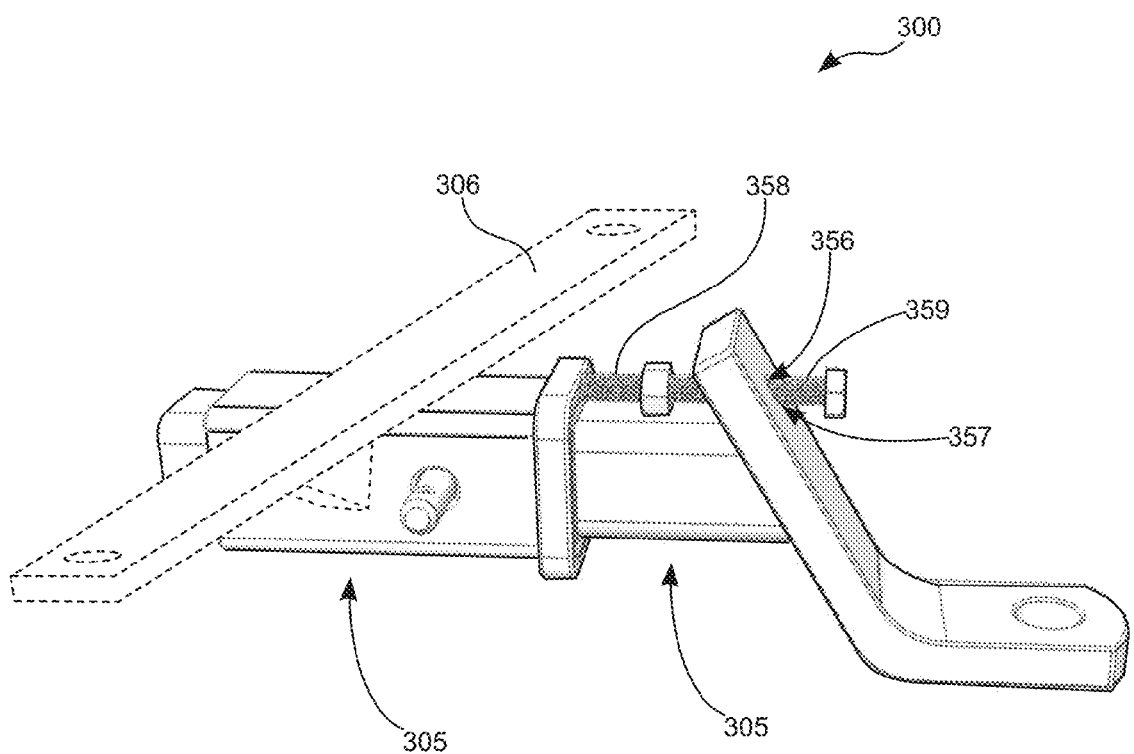
FIG. 3B is another perspective view of the third embodiment illustrating the movement eliminating trailer hitch ball-mount system according to an embodiment of the present invention of FIG. 3A.

Referring now to FIG. 3B is another perspective view of the third embodiment illustrating movement eliminating trailer hitch ball-mount system 300 according to an embodiment of the present invention of FIG. 3A.

Vehicle mount 306 is nonremovably attached to first end 307 of drawbar receiver 308 as in the other embodiments. Second side 321 of ball mount portion 317 is non-removably attached to one end of receivable shaft 316 of drawbar 315. Movement eliminating bolt 322 threadably extends through ball mount portion 317 from first side 320 through to second side 321 above attachment point 323 of receivable shaft 316 on second side 321. The upwardly angled two thirds portion 342 of ball mount portion 317 is attached to receivable shaft 316 on second side 321 leaving an adequate space above it for movement eliminating bolt hole 355 and for movement eliminating bolt 322 to threadably pass through without interference from receivable shaft 316. Movement eliminating bolt 322 is positioned horizontally through ball mount portion 317, is positioned parallel to receivable shaft 316, and includes backup nut 335 for locking the adjustment of movement eliminating bolt 322 in relation to ball mount portion 317 and against front face 311 of tubular portion 310. Ball mount portion 317 is comprised of flat bar steel 340 having two thirds portion 342 of the total length angled upward at about 65 degrees from horizontal ⅓ portion 344. Horizontal ⅓ portion 344 has throughhole 330 for installation of trailer ball 325. Trailer ball 325 comprises coupler first portion 326, shaft boss 327, threaded shaft 328, and shaft nut 329. Ball mount portion 317 includes movement eliminating bolt hole 355 having female threads 356 about inner periphery 357 and movement eliminating bolt 322 comprises male threads 358 about outer periphery 359 for threadably coupling movement eliminating bolt 322 through movement eliminating bolt hole 355 of ball mount portion 317 to contact front face 311 of drawbar receiver 308.

Coupler first portion 326, shaft boss 327, and threaded shaft 328 are linearly and integrally formed and shaft nut 329 is designed to be threadably coupled to threaded shaft 328. It should be noted that the coupler second portion is the ball socket of the trailer tongue in all embodiments. Threaded shaft 328 is adapted to be inserted through throughhole 330 of ball throughhole end 319 and rigidly attached by threading shaft nut 329 onto threaded shaft 328 and tightening. The outside dimension of receivable shaft 316 is sized such that it is able to be slideably inserted into tubular portion 310 of second end 309 of receiver 305 and locked in place via lateral lock pin 332. Lateral lock pin 332 is insertable through a plurality of laterally deposed and aligned lateral lock pin holes 333 in tubular portion 310 and in receivable shaft 316. Movement eliminating bolt 322 is able to be threadably adjusted to contact front face 311 of tubular portion 310 of second end 309 of receiver 305 when movement eliminating trailer hitch ball-mount system 300 is in an assembled condition and installed on a towing vehicle and a trailer, to eliminate the lateral and vertical movement of drawbar 315 within receiver 305 to stabilize any swaying motion during travel which increases the safety factor of towing a trailer.

Drawbar and hitch receiver movement eliminating systems 100, the drawbar and hitch receiver movement eliminating clamp 200, and the movement eliminating trailer hitch ball-mount system 300, may be sold as kits 150, 250, and 350 comprising the following parts for kit 150: at least one drawbar portion 115 having movement adjustment portion 117 with movement adjustment nut 118; at least one trailer mount 129; and at least one set of user instructions.

Drawbar and hitch receiver movement eliminating clamp 200 may comprise the following parts for kit 250: at least one clamp portion 225; and at least one set of user instructions.

Movement eliminating trailer hitch ball-mount system 300 may comprise the following parts for kit 350: at least one drawbar 315 having ball mount portion 317 with movement eliminating bolt 322, backup nut 335; and at least one set of user instructions.

The kits have instructions such that functional relationships are detailed in relation to the structure of the different embodiments of invention (such that the invention can be used, maintained, or the like in a preferred manner). The three embodiments, drawbar and hitch receiver movement eliminating systems 100, drawbar and hitch receiver movement eliminating clamp 200, and movement eliminating trailer hitch ball-mount system 300, may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A drawbar and hitch receiver movement eliminating system comprising:
    a receiver portion having;
        a vehicle mount on a first end; and
        a drawbar receiver on a second end, said second end having a tubular portion having a front face;
    wherein said vehicle mount is nonremovably attached to said first end of said drawbar receiver;
        a drawbar portion having a receivable shaft, a movement adjustment portion, and a movement adjustment nut, wherein said receivable shaft and said movement adjustment portion are linearly and integrally constructed;
    wherein said movement adjustment portion comprises male threads on an exterior periphery and wherein said movement adjustment nut comprises female threads on an inner periphery, wherein said movement adjustment portion and said movement adjustment nut are adapted to be threadably coupled together via said male threads of said movement adjustment portion and said female threads of said movement adjustment nut;
    a ball mount portion having a movement adjustment attachment end, a ball throughhole end, a first side, and a second side, wherein said second side of said movement adjustment attachment end is non-removably attached to said movement adjustment portion of said drawbar portion;
    a trailer ball comprising a coupler first portion, a shaft boss, a threaded shaft, and a shaft nut, wherein said coupler first portion, said shaft boss, and said threaded shaft are linearly and integrally formed and wherein said shaft nut is designed to be threadably coupled to said threaded shaft;
    wherein said threaded shaft is adapted to be inserted through a throughhole of said ball throughhole end and rigidly attached via a threadably coupling of said shaft nut to said threaded shaft;
    wherein an outside dimension of said receivable shaft is dimensioned such that it is able to be slideably inserted into said tubular portion of said second end of said drawbar receiver and locked in place via a lateral lock pin, said lateral lock pin insertable through a laterally deposed and aligned lateral lock pin holes in said tubular portion and said receivable shaft; and
    wherein said movement adjustment nut is able to be threadably adjusted to contact said front face of said tubular portion of said second end of said drawbar receiver when said drawbar and hitch receiver movement eliminating system is in an assembled condition on a towing vehicle to eliminate a lateral movement and a vertical movement of said drawbar portion within said drawbar receiver to stabilize a swaying motion of a trailer coupled to said towing vehicle to increase a safety factor thereof.

2. The drawbar and hitch receiver movement eliminating system of claim 1 wherein said movement adjustment nut is substantially cylindrical and adapted to be rotated via a spanner wrench.

3. The drawbar and hitch receiver movement eliminating system of claim 2 wherein said movement adjustment nut comprises equidistantly spaced linear groves deposed longitudinally across an exterior of said movement adjustment nut for gripping via said spanner wrench.

4. The drawbar and hitch receiver movement eliminating system of claim 2 wherein said movement adjustment nut of said drawbar portion and said front face of said drawbar receiver each comprise a flat contact face adapted for contacting each other during an in-use condition.

5. The drawbar and hitch receiver movement eliminating system of claim 1 wherein said receivable shaft of said drawbar portion and said tubular portion of said drawbar receiver each are adapted to have a substantially square cross-section.

6. The drawbar and hitch receiver movement eliminating system of claim 1 wherein said movement adjustment nut is removable from said drawbar portion.

7. The drawbar and hitch receiver movement eliminating system of claim 1 wherein said male threads of said movement adjustment portion are adapted to prevent said movement adjustment nut from contacting said second side of said movement adjustment attachment end of said ball mount portion.

8. The drawbar and hitch receiver movement eliminating system of claim 1 wherein said movement adjustment portion of said drawbar portion is cylindrically shaped and transitions to a square cross-section at said receivable shaft.

* * * * *